US005900538A

United States Patent [19]
Bastian

[11] Patent Number: 5,900,538

[45] Date of Patent: May 4, 1999

[54] MONITORING OF DECOMPOSITION GASES IN TRANSFORMERS BY REFERENCING VOLUME OR PRESSURE TO TEMPERATURE

[76] Inventor: Jürgen Bastian, rue Norbert Bourgeys, B-1421 Ophain B.S.I., Belgium

[21] Appl. No.: 08/771,842

[22] Filed: Dec. 23, 1996

[30] Foreign Application Priority Data

Jan. 5, 1996 [EP] European Pat. Off. ............. 96-100103

[51] Int. Cl.[6] ...................................................... G01M 3/04

[52] U.S. Cl. ............................... 73/49.2; 73/295; 340/605

[58] Field of Search ................................ 73/19.05, 25.05, 73/292, 295, 49.2, 25.01; 324/426, 435, 437; 340/605, 626; 361/37, 120

[56] References Cited

U.S. PATENT DOCUMENTS

| | | | |
|---|---|---|---|
| 4,148,086 | 4/1979 | Landa | 340/636 |
| 4,223,364 | 9/1980 | Sangster | 361/37 |
| 4,908,730 | 3/1990 | Westrom | 361/120 |
| 5,281,955 | 1/1994 | Reich | 324/435 |

*Primary Examiner*—Christine K. Oda

[57] ABSTRACT

By referencing either liquid volume or liquid pressure to liquid temperature, either in an implicit way and mechanically or in a non-implicit way and metronomically, the development of an electrical fault or loss of liquid can be detected. The present invention is based on the principle that any deviation from the relation between temperature and volume of a liquid, or, by implication, temperature and pressure in that liquid—the latter relation being applicable to closed systems only—is indicative either of an electrical fault in the transformer or of liquid loss from the transformer.

3 Claims, 2 Drawing Sheets

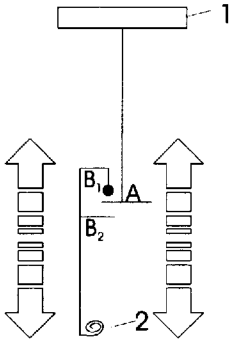
Fig. 1
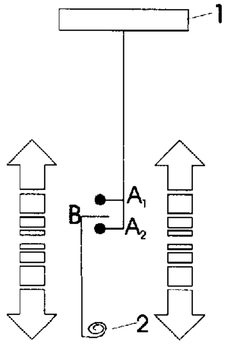
Fig. 1a
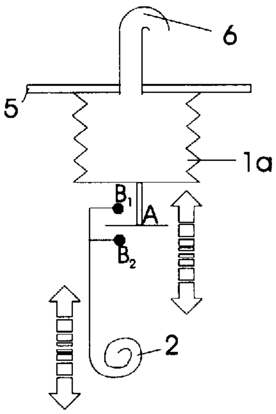
Fig. 1/H/o
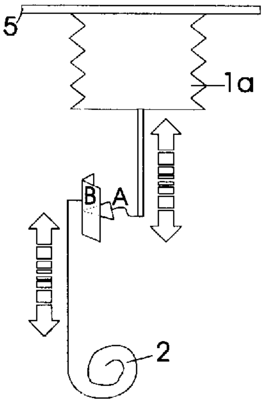
Fig. 1/H/i
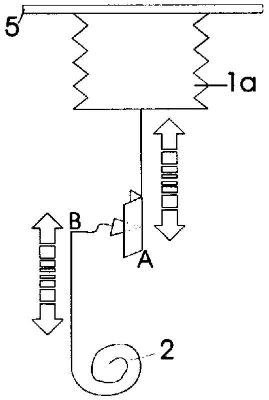
Fig. 1/H/ia

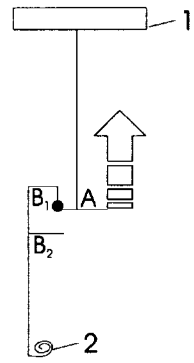
Fig. 2
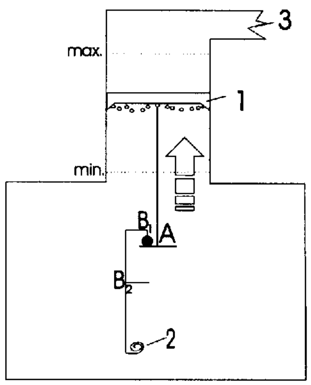
Fig. 2/E
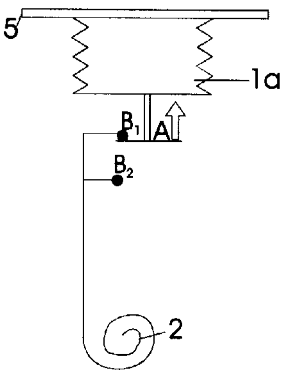
Fig. 2/H
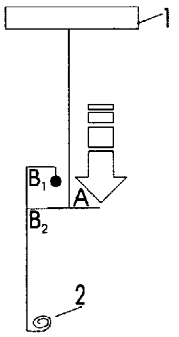
Fig. 3
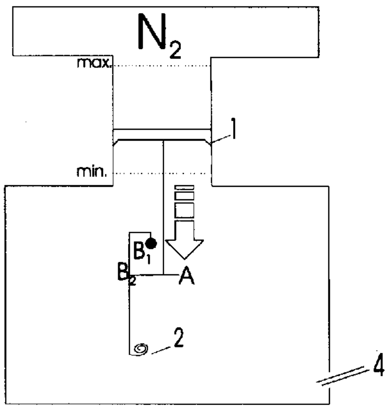
Fig. 3/$N_2$
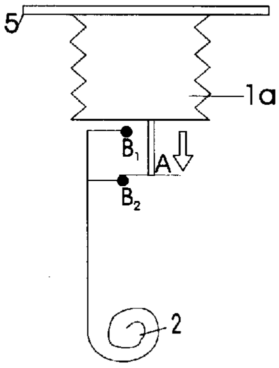
Fig. 3/H

MONITORING OF DECOMPOSITION GASES IN TRANSFORMERS BY REFERENCING VOLUME OR PRESSURE TO TEMPERATURE

REFERENCES CITED

| | | | |
|---|---|---|---|
| US Patent document | 2,273,540 | 02/1942 | Smith |
| US Patent document | 3,855,503 | 12/1974 | Ristuccia |
| US Patent document | 4,223,364 | 10/1980 | Sangster |
| US Patent document | 4,654,806 | 03/1987 | Poyser |

FIELD OF THE INVENTION

The present invention relates to electrical transformers; its subject is the detection of electrical faults and of leaks by taking advantage of a single principle; the translation of that principle into devices matched to the different types of transformer is the core of the invention for which patent protection is being sought.

PRIOR ART

Whether a fault in a transformer can be detected and which methods and devices can be used for the purpose of fault detection depends mainly on whether, dependent on the type of transformer, a fault produces a transient or permanent effect, and whether such effect manifests itself as a malfunction.

Monitoring of oil temperature, whether hotspot or mean temperature, can serve the purpose of fault detection when that temperature is compared to the temperature to be expected; maximum temperature can be logged by a trailing pointer to indicate any past unusual service condition. Similar considerations apply in the case of absolute pressure monitoring which is, of course, only possible for hermetic transformers.

As temperature readings can only be made indicative of a fault when referenced to "expected" temperatures, and as any difference between the two can only be made to serve the purpose of fault indication when such factors as rate of heat transfer are taken into consideration, this type of temperature monitoring can only serve the purpose of early fault detection if certain conditions are met.

Except for the indication of overloads, the usefulness of such measurements depends largely on whether the parameters pressure and temperature can be referenced to other parameters, in particular to the electrical current flowing through the windings at the time at which pressure and/or temperature are measured. Examples for this type of referencing of either pressure or temperature to current can be found in many patent documents, U.S. Pat. No. 4,654,806 (Poyser et al), in particular.

The inaccuracy of this type of referencing, due to the deviation from a state of equilibrium in which, at a given temperature of the surrounding air, a constant current would translate into a constant oil temperature, must translate into a delay in the indication of a service anomaly. Therefore this type of monitoring is not suitable for the fast detection of a fault condition.

If the electrical current alone is controlled, as is the case with current-limiting fuses, allowance being made for the heating equivalent $I^2 \cdot t$, low current faults cannot be detected. (Any fault on the secondary, even at relatively high current, is difficult to detect by primary current-limiting fuses, or will be detected late.) Much the same limitations concern detection devices deemed to respond to transient conditions such as the Buchholz relay in its function as detector of decomposition gases: If decomposition gases traveling to the conservator via the gas trap are insufficient in quantity or if the gas is dissolved immediately, detection is impossible, or the gas may only re-enter the gaseous phase later when prevailing conditions of oversaturation cause a change of phase. Such delayed response is not helpful for early fault detection.

The limitations associated with delayed gas detection have led to the use of the Buchholz relay as an instrument for the detection of pressure waves as indicators of a fault condition. However, it has become clear that in the case of fast-escalating fault currents, i.e. high-energy arcs, the Buchholz protection may often not be able to act in time and will only limit, rather than prevent, the damage caused.

The devices used for fault detection have in common that they detect faults during a late phase of their development, or that they detect anomalies such as overload conditions.

In view of these limitations and bearing in mind that high-energy faults are typically preceded by low-energy faults—if we except transient overvoltages as having their origin outside the transformer—the detection of low-energy faults is of great importance under the loss prevention aspect. As low-current faults entail molecular changes in the insulating liquid which translate into the generation of decomposition gases which cause an increase in the fluid volume, transient or permanent, which, dependent on the type of construction, may translate into an increase in pressure, the present invention is based on the possibility of utilizing any undue or disproportionate increase for diagnostic ends, any such increase being considered undue or disproportionate when compared to the due or proportionate increase due to temperature increase.

The principle can be best illustrated by referring to an ideal hermetic transformer having a steady and unchanging load and a steady and unchanging rate of heat transfer or to a transformer in which heat transfer is load dependent and which has a time constant of zero. In such a transformer, any change in pressure would be indicative of an interior fault or of a loss of liquid.

CRITICAL APPRAISAL OF PRIOR ART

In the context of the invention described below, some devices are of particular interest for hermetic transformers: apart from current-limiting fuses, a device generally known as the DGPT (détecteur, gaz/pression/température) to detect either gas formation, pressure or temperature with one single device) and functionally similar devices of varied designs.

Buchholz and DGPT utilize one single event or parameter. Thus measurement of pressure in the DGPT does not, on its own, permit the conclusion of whether that pressure is the pressure to be expected at the mean temperature of the liquid. (In an elastic system, any mean temperature rise translates into a corresponding rise in pressure.) Referencing one to the other can therefore be used for diagnostic and loss prevention purposes. U.S. Pat. No. 3,855,503 (Ristuccia), as well as other patent documents, refers to the documented phenomenon that a pressure rise precedes a temperature rise; however, this fact is only used for diagnostic purposes in using the rise gradient as a fault indicator. In that document, as in others, no use is suggested, or indeed made, of the possibility to compare actual to theoretical temperature-referenced values for volume or pressure.

This latter method is used in the present invention and will also be referred to as variance comparison. The contradictory observations on whether pressure rise precedes temperature rise or vice versa are probably due to the way in which temperature was measured and which precluded representativity for mean liquid temperature. Relevant points in those documents are referred to below.

The present invention enables the detection of low-energy faults. State-of-the-art detection of high-energy faults and the emission of a warning signal/isolation of the transformer employs various devices using different principles. The present invention is complementary to such devices. Its primary aim is not the detection of high-energy but of low-energy faults. As there is general agreement that high-energy faults are typically preceded by low-energy faults—assuming that the fault has its origin in the transformer itself-by detecting the low-energy fault we can forestall the high-energy fault.

U.S. Pat. No. 4,223,364 (Sangster) refers to gas cushion transformers and states that in these transformers the relation between temperature and pressure does not exactly follow Boyle's law. No mention is made of the fact that strong sunshine will cause expansion of the gas under the tank cover and thus by causing extra pressure must falsify the readings supposedly reflecting the above relation. In addition to this falsifying element we also have to consider the fact that the gas is in contact with the warmest layer of the liquid. Therefore, the increase in gas pressure is not attributable to the increase in liquid volume alone. Another falsifying influence is the pressure and temperature dependent solubility of the cushioning gas in the liquid.

As stated in U.S. Pat. No. 4,223,364 (Sangster), pressure rise in gas cushion transformers can be delayed thus necessitating parallel and complementary measuring of pressure and temperature. The two parameters are however not referred to as being in correlation with one another, and no use is made in the above patent document for diagnostic purposes of the correlation which exists between temperature, volume and pressure.

As explained in col.1 line 63- col.2 line 13, U.S. Pat. No. 4,223,364 (Sangster) refers to air cushion transformers (cf. FIG. 3 of that document), temperature measurements not being used as a parameter to which another parameter, i.e. pressure, can be referenced. Consequently, the mean liquid temperature is not measured. It is explained that temperature measurements taken in the hottest zone of the liquid column are in advance of the pressure rise (col. 2, lines 59–68). In this, as in the other patent documents cited, pressure and temperature are either not referenced to each other or referenced to each other in an unsuitable way (U.S. Pat. No. 4,223,364, Sangster).

In U.S. Pat. No. 4,223,364 (Sangster) FIG. 1 refers to an apparatus, in which, assuming the pressure and temperature driven parts of an actuating device in contact with a two-armed lever to move in the opposite direction, a lower liquid temperature would require a higher pressure to actuate an isolating switch than would be required at a higher temperature (col. 5, lines 11–19). When an assembly is chosen in which the lever is not rotating, the functions pressure and temperature are said to be "completely decoupled" (col. 5, lines 8–9), i.e. working independently of each other which is erroneously called "cumulative". The term "completely decoupled" does not represent the fact that in normal service conditions and in a hermetic transformer one parameter is conditioned by the other.

Sangster mentions "pivotal coupling" of pressure and temperature, but misinterprets the mechanism. If 7 (in FIG. 1) represents a two-arm lever with 22 representing the axis of rotation, a simultaneous and proportionate increase of pressure and temperature will move the actuating pin to the right in exactly the same way as would be the case in an assembly without rotary axis. A rise in temperature without a rise in pressure is impossible in a hermetic transformer and therefore irrelevant and need not be considered. However, if, in the assembly with rotary axis 22, pressure increases without a proportionate temperature rise, the travel needed for the actuating pin requires a higher pressure than at higher temperature. This effect can hardly have been desired by the inventor (Sangster); however, his explanation does not allow any other conclusion than this: the inventor was not aware that changing the fixed point 22 into a pivotal point for 7 did not result in a safety gain; rather, the element responsible for an eventual fault indication on transformer isolation could, in the worst case, be hindered in its intended function.

When referring to an earlier patent document (U.S. Pat. No. 2,273,540, Smith) Sangster mentions some limits to the above-mentioned law, in particular the lack of constancy of the (gas) volume (col.1 line 63- col. 2 line 13), but no mention is made of the falsifying influence of sun radiation.

For this very reason, however, pressure monitoring in gas-cushion transformers is problematic; it would be so even in the case of temperature referencing of pressure values. The location of the transformer determines whether the method is feasible.

U.S. Pat. No. 2,273,540 (Smith) and U.S. Pat. No. 4,223,364 (Sangster) describe the actuating of the disconnect switch by mechanical means, with a rise either of temperature or of pressure being responsible, or related to each other in an unsuitable manner. While neither Smith nor Sangster demonstrate a "cumulative effect" of a simultaneous rise of pressure and temperature, such effect is apparently sought by both inventors. (Smith p.4, col. 1, lines 15–20; Sangster, col.5, lines 11–19).

The present invention neither seeks nor achieves such cumulative effect, nor indeed does it regard it as desirable. A high pressure in a transformer is far more likely to be indicative of a fault condition when the liquid is cold than when it is hot. This state of affairs apparently escaped the attention of both Smith and Sangster.

While U.S. Pat. No. 3,855,503 (Ristuccia) mentions that the rise of the temperature curve lags behind the rise of the pressure curve, this variance is not utilized for diagnostic purposes. The measured signals are compared to admissible values, pressure values not being referenced to temperature. The explanation for the anomaly described by Ristuccia is to be found in the lack of representativity of the measuring point: Referencing hotspot temperatures to appropriate pressure values would not be useful for diagnostic purposes.

As is explained in FIGS. 4, 5, and 6 of U.S. Pat. No. 3,855,503, monitoring of pressure and temperature is carried out independently of each other: pressure values are never referenced to temperature values taken simultaneously.

U.S. Pat. No. 4,654,806 (Poyser et al) describes a "microproccssor-based transformer monitoring system" in which actual readings are compared to historic values. Once more, variance comparison is not carried out on the basis of temperature-referenced pressure values.

The patent documents cited above apparently refer to large transformers of the gas-cushion type.

The invention described below refers, in its non-mechanical variant, to hermetic transformers and, in particular, to integrally-filled transformers. The non-mechanical variant can only be used in other types of hermetic transformer if falsifying influences such as strong sun radiation can be ruled out.

SUMMARY OF THE INVENTION

According to the industry standard IEC 420, the adequate combination of (a) current-limiting fuses on the primary side of step-down transformers and (b) isolating switches, transformers can be protected against fast-escalating electrical faults. However, the combination of fuses and switches does not offer the same degree of protection in the case of low-energy faults with a low escalation rate, especially when such faults occur on the secondary side of the transformer. Both a sudden loss of cooling liquid, generally referred to as "oil loss" and the production of decomposition gases upset the relation which exists between the mean temperature of the oil and its volume and, by proxy and limited to hermetic systems, the pressure in that liquid. The object of the present invention is the use, for diagnostic and loss prevention purposes, of the detection of any deviation from the relation described. This requires, in abstract terms, a system referencing either liquid volume or liquid pressure to mean liquid temperature.

The means and the degree of preference given to the embodiments described with which such referencing can be carried out depend on the type of transformer to which the invention is to be applied.

Description of the Schematic Drawings Illustrating the Principle of Temperature-referenced Volume Monitoring as Applied to Different Types of Transformer and Various Design Principles Used for Fault Detection.

The translation of the principle for diagnostic and loss prevention purposes into a mechanical device is illustrated schematically in the drawings illustrates a floating piston, 1*a* a bellows, analogous to 1. Either of these elements determines the direction in which a volume-driven contact element A will move. 2 denotes a temperature-driven (temperature-dependent) element. e.g. a bimetal strip, which determines the direction in which the temperature driven contact element B, or B1+B2 will move (B in FIG. 1/H/i, B1+B2 in the other schematic illustrations except FIG. 1*a* which shows a "reversed" arrangement). 3 in FIG. 2/E denotes the connection to an expansion vessel. 4 in FIG. 3$N_2$ indicates an oil leak. 5 is the tank cover of an hermetic transformer. 6 is a tube connecting the interior of the bellows with the outside air (FIG. 1/H/o).

BRIEF DESCRIPTION OF THE DRAWINGS

FIG. 1., FIG. 1*a*, FIG. 1/H/o and FIG. 1/H/ia and FIG. 1/H/ib show the normal service conditions of a transformer assumed to carry varying loads. The liquid volume is determined solely by the mean liquid temperature at any given time; contact element A, while keeping the distances to B1 and B2 in FIG. 1 and FIG. 1/H/o will move upwards or downwards, as the mean temperature of the liquid rises or falls. In FIG. 1/H/i, FIG. 1/H/a and FIG. 1/H/i movement of the two contact elements in the same direction maintains uninterrupted contact. (This is an analogy using reversed status, necessitated by the integration of the two contact elements B1 and B2 into B.)

FIG. 2 is an illustration of an abnormal operating condition: volume increase, not due to/not commensurate with temperature increase leads to the volume-driven contact element A coming into contact with temperature-driven contact element $B_1$.

FIGS. 2/E and 2/H illustrate fault conditions brought about by a fault current/arc: volume increase not due to temperature increase causes contact of A and B1, triggering alarm or transformer isolation.

FIG. 2/E illustrates schematically the operation of the device in a transformer with expansion vessel, FIG. 2/H in a hermetic transformer.

FIGS. 3, 3/$N_2$ and 3/H illustrate the liquid leak condition, 3/$N_2$, illustrating the operation of the device in a nitrogen-cushion transformer, 3H in an integrally-filled hermetic transformer. Liquid loss, indicated by 4 in FIG. 3/$N_2$, causes a liquid volume decrease not due to a drop in liquid temperature, such decrease causing contact between A and B2, triggering an alarm or the isolation of the transformer.

FIG. 1/H/o illustrates volume-driven contact element A fixed to a bellows whose interior communicates with the outside air.

FIG. 1/H/i illustrates the design changes made necessary by the integration of contact elements B1 and B2 into B and the reversal of status this implies.

FIG. 1*a* shows a reversal of the arrangement shown in FIG. 1.

FIG. 1/H/ia shows reversal of the arrangement shown in FIG. 1/H/i.

EXPLANATIONS TO THE SCHEMATIC DRAWING USING REPRESENTATIVE EXAMPLES:

Any increase in volume caused by a rise in the mean temperature of the liquid causes an upward movement of the float 1, as illustrated in FIG. 1, FIG. 1*a*, FIG. 2, FIG. 2/E, FIG. 3, and FIG. 3/$N_2$, or analogous element under bellows 1*a*, as illustrated in FIG. 2/H, FIG. 1/H/o, FIG. 1H/i, FIG. 1H/ia, FIG. 2/H and FIG. 3/H. which causes contact element A to move in the same direction; simultaneously the rise of the mean temperature causes contact elements B1 and B2 or, in the integrated version, B (FIG. 1/H/i), driven by a bimetal strip 2, designed and installed to move in the same direction (i.e. upwards) and by the same increments. In the arrangement shown in FIG. 1/H/i the integration of the two contact elements into one contact element on the temperature side, but possible either on the "volume" or on the "temperature" side, (FIG. 1/H/ia and FIG. l/H/ib) necessitates a reversal of the status of the contacts: under normal service conditions contact between the "volume" and the "temperature" side is maintained, under abnormal service conditions contact is interrupted. For the sake of clarity, the illustrations (with the exception of FIG. 1*a* which illustrates the possibility of a reversal of the arrangement in FIG. 1) show the arrangement in which two contacts are attributed to the "temperature" side and only one contact to the "volume" side.

In the integrated contacts version (e.g. FIG. 1/H/i, FIG. 1/H/ia, FIG. 1/H/ib) the contact between the volume-driven contact element A and the temperature-driven contact element B is maintained—instead of the contacts being kept apart, as shown in the illustrations showing the non-integrated arrangement—under normal service conditions and interrupted under abnormal service conditions, while in the non-integrated arrangement with two contacts on one and one contact on the other side contact is made under abnormal service conditions.

Under normal service conditions a drop of the mean temperature causes all contact elements to move downwards, while the distances between the contacts are maintained, as illustrated in FIG. 1, FIG. 1*a*, FIG. 1/H/o, FIG. 1/H/i and FIG. 1/H/ia.

Any fluid volume increase due to decomposition gas formation will, if sufficiently large, cause contact between contact elements A and B1 e.g. (FIG. 2, FIG. 2/E, FIG. 2/H) or, in the case of the integrated contact B in FIG. 1/H/i, breaking of contact. Conversely, any decrease in liquid volume not caused by a commensurate liquid temperature drop causes the gap between A and B2 to be narrowed and entails closure of the circuit, as illustrated in FIG. 3, FIG. 3$N_2$, FIG. 3/H or, in the case of the integrated contact B in FIG. 1/H/i, breaking of contact.

It is theoretically possible that one extremely low fault of long duration will only become noticeable "after the event". Typically this can be expected to happen when the decomposition-gas-saturated liquid becomes oversaturated on cooling. This possibility is of great importance, as it ensures detection of faults before their eventual escalation. The triggering gas would normally be hydrogen, due to its low solubility.

DESCRIPTION OF THE INVENTION AND ITS PRACTICAL APPLICATION

The sensitivity of temperature-referenced volume monitoring depends on whether the actual state of the appliances is really "read". This means that decomposition gas formation must translate into disproportionate volume increase. Vibrations and wear of the device must not impair its sensitivity. Any design which helps the decomposition gases to impact on the float, rather than quickly dissolve in the liquid, will benefit the sensitivity of the device (FIG. 2/E).

Other variants of the principle could be envisaged: The bimetal strip could be substituted by a piston in a gas cylinder actuating a pin (concerns contact elements B1 and B2, or B in FIG. 1/H/i).

To exclude false alarms etc. due to vibration, dampening elements can be used. However, it is well known that a liquid medium dampens vibrations of a solid body quite efficiently and to a much greater extent than would be possible in gas.

Utilization for diagnostic purposes of the correlation between liquid temperature, volume and pressure in the present invention is by various means which are determined by the type of transformer design. In the case of the breathing transformer, the principle is applied by recourse to a mechanical device; in the case of the integrally-filled (integrally filled=without a gas cushion) hermetic transformer also by recourse to electronically operated comparison between actual and logged data, the basis of comparability being temperature referencing of pressure. The alternatives do not always exclude each other.

As FIG. 1 illustrates, liquid volume is referenced mechanically to the temperature that determines that volume. The method can also be used for gas cushion transformers. Under certain conditions, the method of temperature-referenced pressure monitoring can also be used for the gas-cushion type.

As any liquid volume increase in a hermetic transformer translates into a pressure increase, pressure can be referenced to the temperature responsible for that increase, as detailed below. The method is particularly suited to the integrally-filled transformer, as, assuming the same flexibility of the tank and absence of any falsifying factors, pressure increase will be greater than in the transformer with a gas cushion.

It is feasible to use the principle of temperature-referenced volume monitoring in integrally-filled and other types of hermetic transformers. (FIGS. 1/H/o; 1/H/i; 2/H; 3/H)

Monitoring of liquid volume changes of the integrally filled hermetic transformer of conventional design can only be used for diagnostic purposes if such changes are monitored as pressure changes or if the design incorporates a device which provides for the monitoring of the temperature-commensurate changes of the volume itself.

This can best be achieved by a bellows reaching downwards from the tank cover into the liquid, such bellows being either closed or its gas content communicating with the outside air. FIG. 1/H/i shows the closed bellows variant which may incorporate a balancing spring whose movements are calculated to represent the temperature-driven changes in the liquid volume, which results in a uniform movement of the contact elements as shown in FIG. 1/H/i for the variant in which at least one contact element is a contact area or zone. The ratio of bellows' height to width and the choice of a balancing spring will have to be carried out empirically, bearing in mind that the introduction of a bellows will change the liquid volume and will thus change the relation of volume to pressure.

Instead of a bellows, for which one would normally choose an impermeable and universally compatible polymer such as PTFE, spring-balanced bag-type deformable membranes can be used, weldable laminates with a gas barrier layer being an obvious choice for the material.

The use of a closed bellows necessitates a very precise matching not only of bellows' volume to liquid volume but also of the right ratio of bellows' width and travel to ensure commensurate movements of the contact elements B or B1+B2. Use of a compensating or balancing spring compensates, at least partially, the tendency of the gas to expand faster than the liquid, as the gas is in contact with the hottest liquid zone. This permits close tolerances.

However, as falsifying influences such as sun radiation and rapid changes in outside air temperature cannot be completely ruled out, the variant using a bellows which is open to the outside air will be the preferred embodiment for gas-cushion transformers. The opening will be protected by an inverse U-bend.

This arrangement lends itself to being used in gas-cushion transformers, but is not suitable for conventional designs of the conservator or flexible tank type.

Transformers other than those of the integrally filled type show a low degree of deformability, either elastic or plastic. The invention described below assumes elasticity of the tank. Should plastic deformation occur, self-adjusting of the pressure values will be necessary to avoid false alarm and unwarranted isolation.

The application of the principle described below includes the possibility of autoadjustment of the pressure curve, pressure monitoring being, of course, volume monitoring "by proxy".

Plastic deformation has a bearing on the curve of theoretical pressure values.

The ideal pressure-variable hermetic transformer is free from plastic deformation and does not have any limits of elastic deformation. The real transformer, however, can be subject to plastic deformation due to overpressure and materials' fatigue. Plastic deformations are generally regarded as irreversible. Theoretically it is possible to fill a hermetic transformer in such a way that negative pressure will not be encountered throughout the service temperature range. Plastic deformations put a limit on elastic deformability. They are always undesirable and can be limited to a minimum by adequate engineering. However, as they cannot be excluded principally, their occurrence is theoretically taken for granted and taken into account as explained below.

The inner volume increase of the transformer due to plastic deformation results in a small decrease of the reference pressure. Such decrease depends on the type of transformer and its load cycles. The more rigid the transformer construction, the less liable will it be to both plastic and elastic deformation, and the greater will be the pressure increase. For example, in a transformer tank made of rigid cast aluminium plastic deformation is negligible. The phenomenon of plastic deformation is well known to transformer users; in the event of its occurrence some users wanting to reestablish the original theoretical pressure values proceed to topping-up with liquid in very small quantities. (Normally this procedure is not followed because re-establishment of theoretical pressure values is only of importance for testing purposes.) In principle, the adjusted curve for the pressure values $p'_{theoretical}$ is determined by the degree of plastic deformation. Only by compensating the falsification due to plastic deformation can the curve of reference values ($p_{theoretical} \rightarrow p'_{theoretical}$) be used for variance comparison between $p_{actual}$ and $p_{theoretical}$ for the purpose of early fault detection. Where plastic deformation is insignificant in metronomic terms, $p_{theoretical} = p'_{theoretical}$ applies. Liquid losses due to small leaks are metronomically analogous to plastic deformations. As explained later in detail, pressure monitoring, when temperature-referenced, can serve the function of leak detection.

The curve which plots the corrected $p_{theoretical}$ values describes the progression of the transformer's interior pressure, as it takes into account the fact that volume increase is a consequence of temperature increase, the volume increase causing elastic and, possibly, plastic deformation of the tank. Correction will normally not occur, or only in the case of materials' fatigue leading to plastic deformation.

The adjusted curve for pressure values ($p'_{theoretical}$) can only be established empirically and has to be continuously re-adjusted (electronically) should the values for $p_{actual}$ fall below the insufficiently compensated values for $p_{theoretical}$ ($p_{theoretical} \rightarrow p'_{theoretical} p''_{theoretical}$, etc.). In practice the need for this depends on extremes of load and choice of materials.

Self-adjustment, as described, is carried out electronically and at low cost, conveying a very high level of protection to the object monitored by this method, i.e. the integrally filled hermetic transformer. By contrast, adjustment of a reference curve is cumbersome, when recourse is made to mechanical means; it will also be more costly and more liable to malfunction.

As we have to assume a temperature gradient in the insulating medium, we have to determine empirically the place and number of temperature measuring points, except where the temperature measured in the thermometer pocket or other favorable place truly represents the mean temperature of the liquid. In some cases a correction factor has to be applied. This will be determined by the type of transformer and again has to be verified empirically. The smaller the transformer, the smaller will be the temperature gradient of the liquid, especially if thermosyphoning is excellent.

Temperature-referenced volume monitoring does not have the inherent disadvantages of monitoring of pressure and/or temperature by mechanical means as described in other patent documents (e.g. patents Smith and Sangster). There is, however, an inherent disadvantage when compared to the metronomic/electronic method which is distinguished by the facility with which auto-adjustments can be carried out.

Plastic deformation results in a drop in the actual pressure values below the curve described by the theoretical pressure values. As this entails falsification, it must entail automatic adjustment. In the absence of plastic deformation and in the absence of leaks, there is no need for auto-adjustment.

It is understood that only a drop, not a rise, in the actual pressure values triggers adjustment of the reference values and only within limits which are determined arbitrarily and have to be established empirically. No adjustment will take place in the opposite direction. (In practice, partial discharges and transient overvoltages leading to decomposition gas formation do not entail significant pressure rises in integrally-filled transformers working in typical networks with modest primary voltages.)

Temperature-referenced pressure monitoring as described above enables fault detection both in the event of a sudden pressure decrease and in the event of a slow or sudden pressure increase. It is also possible to indicate repeated automatic adjustment, which would indicate a serious leak.

Comparison of actual with theoretical pressure values has thus four functions:

a) it enables adjustment of the reference values $p'_{theoretical}$ in the event of plastic deformation or of insignificant leaks;

b) it enables fault detection in the event of any pressure rise not due to a temperature rise, irrespective of the degree of such rise; it is thus possible to detect faults which are typically not detected either by Buchholz relay or analogous devices or by fuses (a typical example being an impending winding fault with formation of decomposition gases which are not detected immediately but only during or after the cooling phase of the saturated liquid).

c) it enables detection of a sudden pressure decrease in the event of liquid loss.

d) it enables logging of the frequency with which adjustments are made over a defined timespan as well as indication of such frequency showing the probability of a leak.

While in principle topping-up is neither desirable nor advisable, it is theoretically possible but requires "manual" adjustment in the direction opposite to automatic adjustment.

Liquids being practically incompressible, any counter pressure due to volume increase from the tank results in a measurable pressure increase in the liquid.

Thus in a hermetic transformer having a certain elasticity, a pressure increase of 0.1 bar is proportional to a temperature increase of yK, and a pressure increase of 0.2 bar corresponds to a temperature increase of 2 yK. This correlation is, however, only valid over a limited range of temperatures and pressures, as the elasticity of the transformer is limited.

Liquid volume being determined by the mean temperature of the liquid, and the choice of the best measuring point being determined by design details and the viscosity of the liquid, and plastic deformation being dependent on design and materials, mean temperature and the beginning of plastic deformation can only be determined empirically.

The representativity of temperatures in the thermometer pocket has to be verified before a curve for the reference pressure values can be established.

Explanation: The higher the viscosity of the liquid, the greater will be the temperature gradient throughout the liquid, especially if a higher viscosity is not compensated by a higher expansion coefficient. If a high degree of precision is not required, the values obtained in the thermometer pocket should suffice.

The original pressure reference curve ($p_{theoretical}$) can be established by applying exterior pressure values, if necessary, to compensate for plastic deformation in order to obtain a value for the type-specific variance between $p_{theoretical}$ and $p'_{theoretical}$.

External pressure on a transformer tank, by increasing its internal pressure as a consequence of elastic deformation, counteracts plastic deformation of the tank which would occur once the threshold of elastic deformation due to interior pressure is passed. By ensuring that exterior pressure increase stays ahead of interior pressure increase over the service temperature range which typically reaches its maximum at 1.2 to 1.3 bar absolute, one can establish the original reference pressure values. This is best done by small increments of exterior pressure prior to the slow increase of interior pressure as a consequence of heating of the liquid.

EXAMPLE

Hermetic Transformers Either Integrally Filled or With Gas Cushion 1) filling at 20° C. at 1.0 bar absolute
2) increase of exterior pressure resulting in an interior pressure $1.0<p'<1.1$ bar
3) heating of liquid until interior pressure reaches 1.1 bar
4) increase of exterior pressure resulting in an interior pressure $1.1<p''<1.2$ bar
5) heating of liquid until interior pressure reaches 1.2 bar
[6) increase of exterior pressure resulting in an interior pressure $1.2<p'''<1.3$ bar
7) heating of liquid until interior pressure reaches 1.3 bar]

Steps 6 and 7 are only necessary where interior pressures up to 1.3 bar are expected.

As an alternative to heating the liquid, interior pressures can be raised incrementally to the level of the incrementally increased exterior pressure levels by adding the required quantity of liquid, which has to be determined on the basis of the coefficient of volumetric expansion of the liquid and by reference to a pre-established temperature curve. Transformers having a membrane-enclosed gas cushion (balloon) may require the use of a compensatory factor, as the gas volume increase is disproportionate to the volume increase when the liquid is heated rather than added and, in the case of a membrane enclosure, there is no compensation or overcompensation effect due to the fact that part of the gas cushion will be dissolved, as pressure and/or temperature increases.

In principle, temperature-referenced pressure monitoring can be used not only with integrally-filled types but also with gas cushion transformers. However, there are certain limitations, especially the falsifying influence of exposure to strong sunshine, as explained above. In order to avoid frequent automatic reference curve adjustments which indicate an apparent leak due to dissolution of the gas in the liquid and the ensuing pressure drop, it is advisable to follow a simple procedure as described below: After impregnation with a de-gassed liquid, the transformer can be drained and filled with a gas (e.g. nitrogen)-saturated liquid. Alternatively, the reference pressure curve can be established after gas saturation of the liquid has taken place.

The method is likely to be imprecise when used with gas cushion transformers, due to the fact that the expansion coefficient of the gas will not be identical to that of the liquid. In practice this imprecision may not be metronomically significant, as the fact that more gas enters the liquid phase when the liquid temperature and the pressure increase, results in a partial compensation of the disproportionate gas expansion. Exposure to strong sunshine, however, is likely to result in the indication of an apparent fault. Whenever this risk is present, temperature-referenced liquid volume monitoring will be preferable to temperature-referenced pressure monitoring.

The precision of the method is influenced by the different behavior of different liquids in the presence of a fault and with respect to partial discharges and by the fact that the decomposition gases themselves show a different solubility behavior in different liquids: temperature-referenced pressure monitoring will normally be more sensitive in gas-evolving oils than in gas-absorbing oils. Analogous to this observation is the fact that the sensitivity of the method increases with the saturation level of the liquid.

Three factors determine how the solubility curves will develop: type of fault, insulation liquid, and the solubility of each decomposition gas. This fact is in itself not a limitation of the principle of the method but shows its sensitivity to be related to each of the three factors.

Actual pressure is measured by a manometric capsule, and the measured values are digitalized. The digitalized values for actual pressure are compared to those for theoretical pressure. This variance comparison is carried out continuously, e.g. every ten seconds. Whenever the actual pressure values drop below the reference values, adjustment is made to compensate for assumed plastic deformation or apparent loss of liquid.

The adjusted values (p', p", p'" etc.) serve as new reference values against which subsequent actual pressure values are compared. Variance comparison uses the digital rather than analog values, comparison being effected with the aid of or without a computer. Pressure monitoring is known to be very reliable and very accurate; even low-price non-dedicated manometric capsules are able to measure variations of pressure of $<1$ mbar and supply analogous read-out to be converted for digital indication and variance comparison.

It is in the nature of the described method that no distinction can be made between leaks and plastic deformation. This fact does not constitute a limitation of the method, as explained above.

When defining the primary field of application, we assume that current-limiting fuses represent the most common and the most cost-effective type of electrical protection. The present invention is to serve as a complement to current-limiting fuses and assumes the presence of an element able to set off an alarm or disconnect the transformer. Therefore, it is also assumed that the present invention may substitute other devices which require an isolating device.

As it is assumed that variance comparison and the processing of signals will always be slower than current-limiting fuses, the present invention serves the purpose of detecting low-energy faults to which current-limiting fuses cannot react. It is assumed that the non-mechanical variant of the present invention will be particularly valuable for the early detection of low-energy faults in hermetic transformers, even where these are filled with gas-absorbing oils.

There is no doubt that the virgin liquid in the transformer before commissioning will always have a higher flashpoint than the liquid containing a significant quantity of decomposition gases. Decomposition gas saturation is temperature-dependant. Formation of decomposition gases which enter the liquid phase at the moment of their formation will not cause a measurable pressure increase. In the context of the present invention it is also unimportant that low-energy faults will be detected most easily in a medium which is already saturated with decomposition gases, as volume or pressure variance will be detected during the cooling phase. Temperature-referenced monitoring of either volume or pressure will, therefore, limit the drop in flashpoint. Avoidance of a significant drop in flashpoint is ensured by the well-known fact that hydrogen is not only the preponderant decomposition gas but also the least soluble. Hydrogen formation will always be detected long before saturation levels for other decomposition gases are reached.

This is of particularly great relevance when K-class (IEC 1100) liquids are used, as a sufficiently large difference between firepoint and service temperature can thus be maintained, ensuring non-propagating behaviour in the event of a tank burst with ensuing fire-ball which is produced by the ignition of decomposition gases. The advantage of flashpoint decrease limitation extends also to O-class liquids but is not of classificatory relevance.

While I have illustrated and described several specific embodiments of my invention, it will be clear that variations of the details of construction which are specifically illustrated and described may be resorted to without departing from the spirit and scope of the invention as defined in the appended claims.

I claim as my invention:

1. A method to monitor the volume of a liquid insulating medium by mechanical means comprising the steps of detecting one of two abnormal conditions in an electrical transformer, the two abnormal conditions being, a gas liberating fault current in said electrical transformer, or a liquid loss due to a leak from said electrical transformer, wherein one of the two said abnormal conditions changes the position of two sets of contact means relative to each other, the first set of contact means comprising either one contact element or two linked elements being driven by temperature changes, the second set of contact means comprising either two contact elements or one contact element, respectively, the latter set being driven by liquid volume changes, whereby the first set and second set of contact means maintain an open position under normal service conditions and change their position to a closed position, under said one of two abnormal conditions of either a gas liberating fault current or liquid loss due to a leak.

2. A method as described in claim 1 characterized by one of said contact means being designed as a surfacecontact, which maintains contact with the other contact means under normal service conditions, but under abnormal service conditions severing that contact.

3. A method to monitor the pressure in a liquid medium in which any volume change induced by a change in the mean temperature of the liquid translates into a commensurate pressure change, said method to be used with a hermetic transformer, without gas cushion and referred to as an integrally filled transformer, said method using variance comparison of actual temperature-referenced pressure with theoretical temperature-referenced pressure, pressure variance representing volume variance, a means to detect one of two abnormal conditions in said hermetic electrical transformer, the two abnormal conditions being, a gas liberating fault current in said electrical transformer, or a liquid loss due to a leak from said electrical transformer.

* * * * *